(12) United States Patent
Fujita et al.

(10) Patent No.: US 7,676,325 B2
(45) Date of Patent: Mar. 9, 2010

(54) ROAD LANDSCAPE MAP PRODUCING APPARATUS, METHOD AND PROGRAM

(75) Inventors: Ryujiro Fujita, Tsurugashima (JP); Naohiko Ichihara, Tsurugashima (JP); Hiroto Inoue, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 167 days.

(21) Appl. No.: 11/908,821

(22) PCT Filed: Mar. 14, 2006

(86) PCT No.: PCT/JP2006/304988

§ 371 (c)(1),
(2), (4) Date: Sep. 17, 2007

(87) PCT Pub. No.: WO2006/098311

PCT Pub. Date: Sep. 21, 2006

(65) Prior Publication Data

US 2009/0030604 A1     Jan. 29, 2009

(30) Foreign Application Priority Data

Mar. 15, 2005     (JP) .............................. 2005-073029

(51) Int. Cl.
*G01C 21/30*     (2006.01)

(52) U.S. Cl. ..................................... 701/208

(58) Field of Classification Search ................ 701/200, 701/208, 210, 212, 213; 340/988, 990, 992, 340/995.1, 995.11, 995.12, 995.14–995.19, 340/995.22, 995.24; 382/100, 113, 181, 382/191
See application file for complete search history.

(56) References Cited

U.S. PATENT DOCUMENTS

2004/0213459 A1* 10/2004 Ishimaru et al. ............. 382/191

FOREIGN PATENT DOCUMENTS

JP     2003-185453     3/2003

OTHER PUBLICATIONS

Masahiro Hasegawa et al., "Geo-informatics Nyumon", Dai 1Pan, Sep. 20, 2002, ISBN: 4-8446-0683-2, pp. 141 to 151.
Haruhisa Shimoda, "20 Seiki no Gazo Eizo shori Oyo to 21 Seiki eno Kitai to Kadai 1-6 Koku Uchu Bunya no Gazo Eizo shori Oyo", Eizo Joho Media Gakkaishi, vol. 54, No. 12, Dec. 20, 2000, [ISSN] 1342-6907, pp. 1680-1682.

* cited by examiner

*Primary Examiner*—Kim T Nguyen
(74) *Attorney, Agent, or Firm*—Young & Thompson

(57) ABSTRACT

A road landscape map producing apparatus loaded on a movable body for producing a road landscape map including road landscape information showing a surrounding landscape with road landscape classification items obtained by classifying the photographic images of the surrounding landscape into items such as "streetscape", "forest" and "open road" by way of image processing and based on a geographic position at which the surrounding image is photographed.

11 Claims, 10 Drawing Sheets

FIG. 8

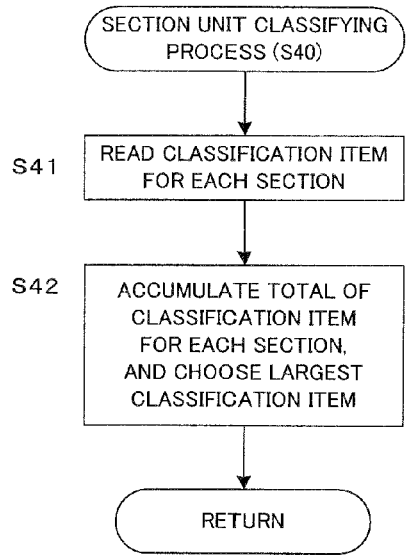

SECTION UNIT CLASSIFYING PROCESS (S40)

S41 — READ CLASSIFICATION ITEM FOR EACH SECTION

S42 — ACCUMULATE TOTAL OF CLASSIFICATION ITEM FOR EACH SECTION, AND CHOOSE LARGEST CLASSIFICATION ITEM

RETURN

FIG. 9

| SECTION | POSITION COORDINATE | ROAD LANDSCAPE CLASSIFICATION ITEM IN SECTION UNIT |
|---|---|---|
| 1 | (x1a,y1a) ~ (x1b,y1b) | FOREST |
| 2 | (x2a,y2a) ~ (x2b,y2b) | FOREST |
| 3 | (x3a,y3a) ~ (x3b,y3b) | OTHER |
| . | . | |
| . | . | |
| N | (xna,yna) ~ (xnb,ynb) | OPEN ROAD |
| . | . | |
| . | . | |
| P | (xpa,ypa) ~ (xpb,ypb) | STREETSCAPE |
| . | . | |
| . | . | |

ROAD LANDSCAPE MAP PRODUCING APPARATUS, METHOD AND PROGRAM

TECHNICAL FIELD

The present invention relates to a producing method of map information, particularly, a producing method of a road landscape map including road landscape information showing a surrounding landscape.

BACKGROUND TECHNIQUE

There is known a navigation apparatus which loads a GPS (Global Positioning System) and displays, on a map, a present position of a movable body such as a vehicle and a person. Generally speaking, the above navigation apparatus displays the present position of the movable body and the surrounding map on a display device. Recently, there is known a navigation apparatus which searches and guides a route to a destination by designating the destination and the route.

Moreover, there is disclosed a navigation apparatus having a function to automatically search and supply a side-trip route for stopping by a good viewing point in such a case that there is the point in the vicinity of a guidance route to a destination in Patent Reference-1.

Patent Reference-1: Japanese Patent Application Laid-open under No. 2003-185453

As described above, in order to search the good viewing point and display it on the navigation device, it is necessary to prepare the map information with which information showing the surrounding landscape is associated. However, it is not easy to obtain the appropriate landscape information from only the information on the map. It is necessary that a person actually goes to the point to view and photograph the landscape. Therefore, it is troublesome and time-consuming to produce the map information including the landscape information.

DISCLOSURE OF INVENTION

Problem to be Solved by the Invention

The present invention has been achieved in order to solve the above problem. It is an object of this invention to provide a road landscape map producing method capable of efficiently producing a road landscape map including road landscape information by executing image processing of a photographed image of a movable body.

Means for Solving the Problem

According to one aspect of the present invention, there is provided a road landscape map producing apparatus which is loaded on a movable body, including: a photographing device which photographs a surrounding image in accordance with movement of the movable body; an image processing unit which executes image processing of the surrounding image and classifies the surrounding image into a predetermined road landscape classification item; and a producing unit which associates, based on a geographic position at which the surrounding image is photographed, the road landscape classification item with map information and produces a road landscape map.

The above road landscape map producing apparatus is loaded on the movable body, and produces the road landscape map. The road landscape map is the map including the road landscape information indicating the surrounding landscape in the road. The road landscape information includes the road landscape classification item obtained by classifying the surrounding landscape such as "streetscape", "forest" and "open road" into some items. In a preferred example, the road landscape map may include the map information and display data visually showing road landscape information corresponding to the road landscape classification item.

Specifically, the photographing device such as a camera photographs the surrounding image in accordance with the movement of the movable body. Preferably, a still picture is photographed as the surrounding image. The surrounding image is classified into the road landscape classification item by the image process. Based on the geographic position at which the surrounding image is photographed, the road landscape classification item is associated with the map information. Thereby, the road landscape map is produced. Since the road landscape map produced in this manner includes the information showing the landscape at each position, by displaying the information, a user can easily know the landscape at each position on the map.

In a manner of the above road landscape map producing apparatus, the image processing unit may include: a characteristics amount extraction unit which extracts a predetermined characteristics amount from the surrounding image; and an image unit classification unit which determines the road landscape classification item by a unit of the surrounding image, based on the characteristics amount. In this manner, by the predetermined image processing to the photographed surrounding image, the road landscape classification item can be automatically determined.

In another manner of the above road landscape map producing apparatus, the characteristics amount extraction unit may extract plural characteristics amounts, and the image unit classification unit may determine one of the plural road landscape classification items as the road landscape classification item by the surrounding image unit, based on the plural characteristics amounts. In this manner, since the road landscape classification item is determined in consideration of the combination of the plural characteristics amounts, the possibility of erroneous determination can be reduced.

In a preferred example, the characteristics amount may include a green vision ratio showing a ratio of a green area included in the surrounding image, a blue sky ratio showing a ratio of a sky area included in the surrounding image and an artificial material amount showing an amount of artificial materials included in the surrounding image. Additionally, the image unit classification unit may determine one of the plural road landscape classification items including a streetscape, a forest and an open road as the road landscape classification item by the surrounding image unit, based on the green vision ratio, the blue sky ratio and the artificial material amount.

In still another manner of the above road landscape map producing apparatus, the producing unit may include: a section unit classification unit which determines the road landscape classification item by the predetermined section unit, based on the road landscape classification item by the surrounding image unit included in a predetermined section of the map information; and an association unit which associates the road landscape classification item by the section unit with the map information for each predetermined section. In this manner, the map information is divided into the predetermined sections, and the road landscape classification item is determined for each section.

In still another manner, the road landscape map producing apparatus may include: a display device; and a display control unit which displays the road landscape map on the display device in a form capable of visually distinguishing the road landscape classification item by the section unit. In this manner, by displaying the road landscape map on the display device, it becomes easy for the user to visually know the road landscape for each section on the display device. In addition, since the road landscape classification item is determined for each section, even when only the part of the section is erroneously determined as the other road landscape classification item due to the noise in the surrounding image and other cause, the accurate road landscape classification can be executed in the entire section.

According to another aspect of the present invention, there is provided a road landscape map producing method, including: a photographing process which photographs a surrounding image in accordance with movement of a movable body; an image processing process which executes image processing of the surrounding image and classifies the surrounding image into a predetermined road landscape classification item; and a producing process which associates, based on a geographic position at which the surrounding image is photographed, the road landscape classification item with map information and produces a road landscape map. By executing the road landscape map producing method, the above-mentioned road landscape map can be produced.

According to still another manner of the present invention, there is provided a road landscape map producing program which is executed by a computer loaded on a movable body, making the computer function as: a photographing unit which controls a photographing device and photographs a surrounding image in accordance with movement of the movable body; an image processing unit which executes image processing of the surrounding image and classifies the surrounding image into a predetermined road landscape classification item; and a producing unit which associates, based on a geographic position at which the surrounding image is photographed, the road landscape classification item with map information and produces a road landscape map. By executing the program in the computer loaded on the movable body, the above road landscape map producing apparatus can be realized.

According to still another aspect of the present invention, there is provided a movable body navigation apparatus, including: a photographing device which photographs a surrounding image in accordance with movement of a movable body; an image processing unit which executes image processing of the surrounding image and classifies the surrounding image into a predetermined road landscape classification item; a producing unit which associates, based on a geographic position at which the surrounding image is photographed, the road landscape classification item with map information and produces a road landscape map; a measurement unit which obtains a present position of the movable body; a display device; and a display control unit which displays the road landscape map around the present position on the display device in a form capable of visually distinguishing the road landscape classification item by a unit of the section. By the movable body navigation apparatus, not only the present position of the movable body but also the surrounding landscape can be displayed on the display device in a visually distinguishable form.

According to still another aspect of the present invention, there is provided a road landscape map producing system, including: a receiving unit which receives a surrounding image photographed in accordance with movement of a movable body via a communication network; an image processing unit which executes image processing of the surrounding image and classifies the surrounding image into a predetermined road landscape classification item; a producing unit which associates the road landscape classification item with map information, based on a geographic position at which the surrounding image is photographed, and produces a road landscape map; and a database which stores the road landscape map. By the road landscape map producing system, a server can produce the road landscape map based on the surrounding image photographed by the movable body, and the database can store the road landscape map. Particularly, by using the plural movable bodies, it becomes possible to efficiently produce the road landscape map in a wide range in a short time.

According to still another aspect of the present invention, there is provided a road landscape map producing system, including: a receiving unit which receives, via a communication network, a part of surrounding images photographed in accordance with movement of a movable body and classified into a predetermined road landscape classification item after image processing; a producing unit which associates, based on a geographic position at which the surrounding image is photographed, the road landscape classification item with map information and produces a road landscape map; and a database which stores the road landscape map. By the road landscape map producing system, only the part (e.g., the part having the large characteristics amount) of the surrounding image photographed by the movable body and classified after the image processing is transmitted and stored in the database. Therefore, since only the necessary surrounding image is transmitted via the network, the communication amount can be advantageously saved.

BRIEF DESCRIPTION OF THE DRAWINGS

FIG. 8 is a flow chart of a section unit classifying process;

FIG. 9 shows examples of road landscape classification items which are classified by a section unit;

BRIEF DESCRIPTION OF THE REFERENCE NUMBER

Figure 1:
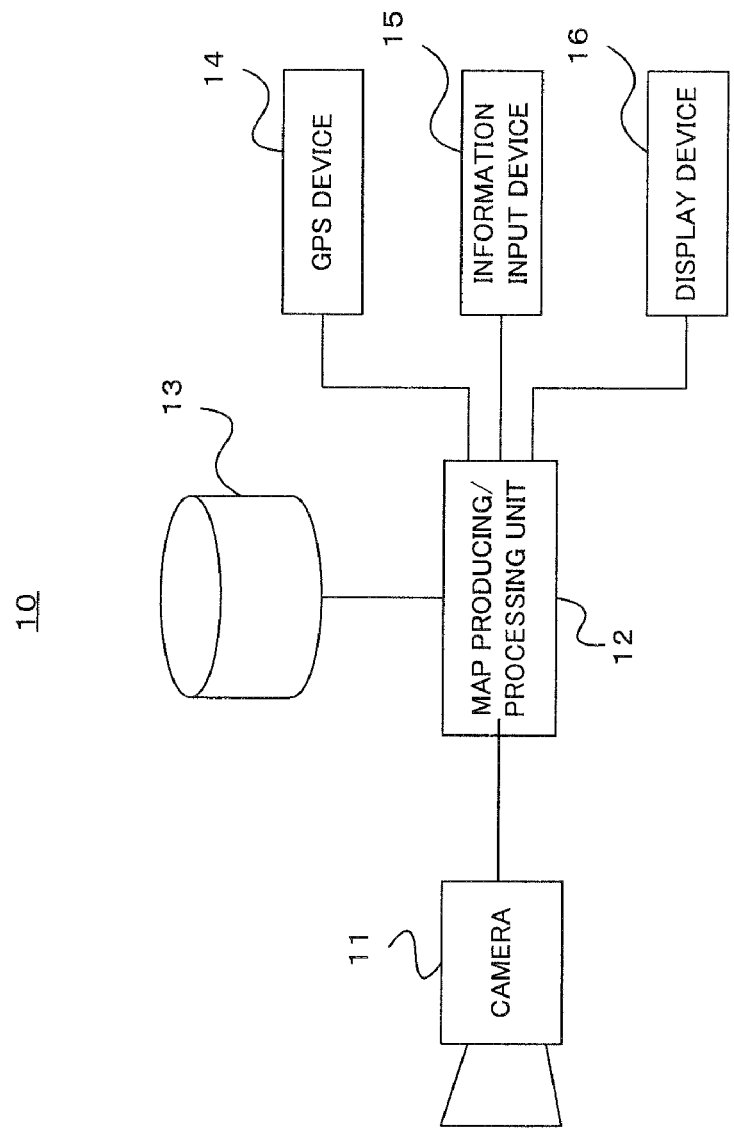
FIG. 1 is a block diagram schematically showing a configuration of a road landscape map producing apparatus according to a first embodiment.

2 Movable body
10 Road landscape map producing apparatus
11 Camera
12 Map producing/processing unit
13 Storage device
14 GPS device 15 Information input device
16 Display device
100 Road landscape map producing system
110 Network
112 Server
114 Database

DETAILED DESCRIPTION OF THE PREFERRED EMBODIMENTS

The preferred embodiments of the present invention will now be described below with reference to the attached drawings.

First Embodiment

Configuration of Road Landscape Map Producing Apparatus

FIG. 1 shows a schematic configuration of a road landscape map producing apparatus according to a first embodiment of the present invention. A road landscape map producing apparatus 10 (hereinafter, simply referred to as "map producing apparatus", too) shown in FIG. 1 is loaded on a movable body such as a vehicle, and automatically produces a road landscape map including a road landscape information based on a photographed image. As shown, the map producing apparatus 10 includes a camera 11, a map producing/processing unit 12, a storage device 13, a GPS device 14, an information input device 15 and a display device 16.

The camera 11, which is arranged on the front side of the vehicle, functions as a photographing device. The camera 11 constantly photographs a surrounding image (still picture) in accordance with the movement of the movable body on which the map producing apparatus 10 is loaded. The GPS device 14 includes a GPS antenna and an operation unit, and calculates the present position of the movable body. The present position of the movable body is generally obtained as a geographic coordinate (latitude, longitude and altitude).

The information input device 15 is used when the operator inputs the necessary information. When the map producing apparatus 10 is formed by a computer terminal, the information input device 15 is formed by a keyboard and a mouse. Meanwhile, when the map producing apparatus 10 is formed as a dedicated apparatus, the information input device 15 is formed by plural operation buttons. The display device 16 is formed by a liquid crystal monitor, for example. While the surrounding image is photographed by moving the movable body, the photographed surrounding image can be displayed on the display device 16. In addition, the road landscape map produced by the map producing apparatus 10 can be displayed on the display device 16, and a navigation of the movable body can be also executed during displaying of the road landscape map around the present position obtained by the GPS device 14.

The storage device 13 stores not only the normal map data but also the data of the road landscape map produced by the map producing unit 12. Additionally, the storage device 13 stores various kinds of data in the producing process of the road landscape map, as need arises.

While producing the road landscape map, the map producing/processing unit 12 controls each component, and executes the necessary process. Concretely, while the movable body travels, the map producing/processing unit 12 supplies a photographing instruction signal showing a photographing timing of the surrounding image to the camera 11. Further, the map producing/processing unit 12 executes predetermined image processing to the surrounding image photographed by the camera 11, and produces the road landscape map.

(Road Landscape Map Producing Process)

Figure 2:
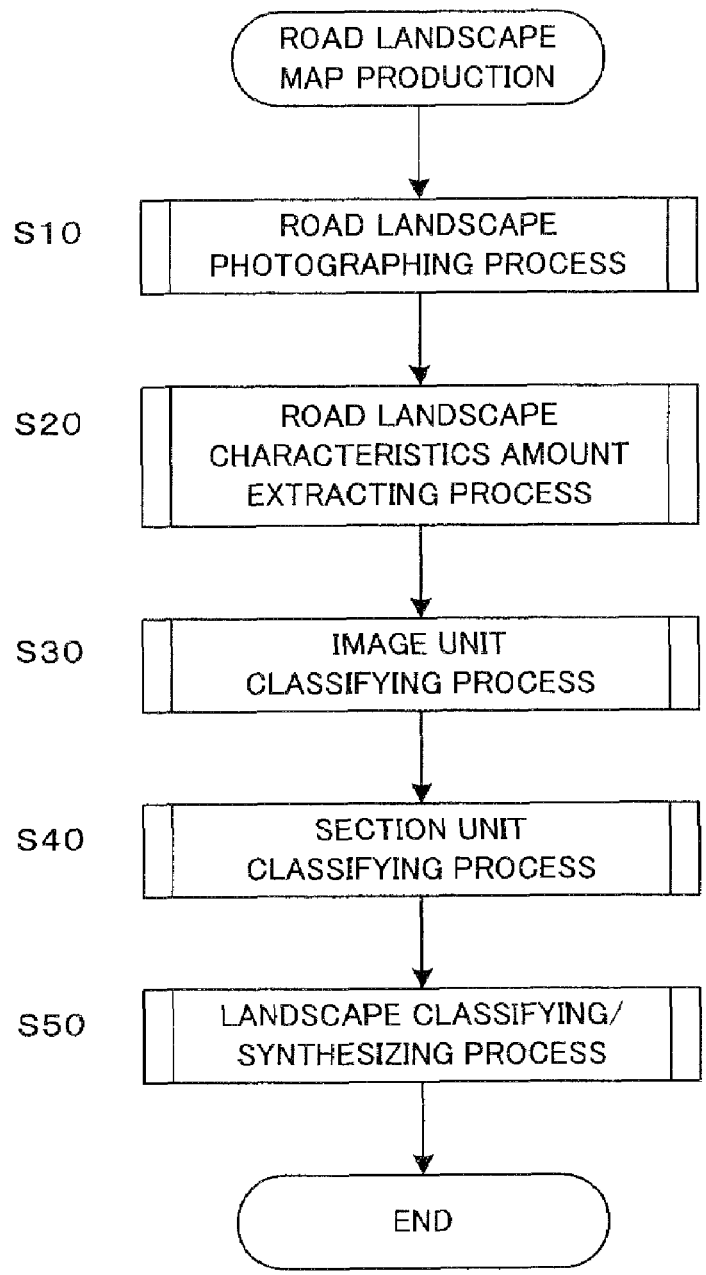
FIG. 2 is a flow chart of a road landscape map producing process.

Next, a description will be given of a road landscape map producing process. FIG. 2 shows a flow chart of the road landscape map producing process. The road landscape map producing process, which will be explained below, is basically executed by the map producing/processing unit 12 in the map producing device 10. When the map producing apparatus 10 is formed by the computer terminal, a CPU of the computer executes a prepared road landscape map producing program, and thereby the road landscape map producing process is executed.

First, a description will be schematically given of the road landscape map producing process with reference to FIG. 2. As for a process of each step shown in FIG. 2, a detailed explanation will be given, respectively. First, the map producing/processing unit 12 executes the road landscape photographing process, and photographs the surrounding images in accordance with the movement of the movable body (step S10). The surrounding images are photographed as the plural still pictures. Next, the map producing/processing unit 12 executes the road landscape characteristics amount extracting process, and executes the predetermined image processing to the photographed surrounding images, and extracts the characteristics amount of the road landscape (step S20). Next, the map producing/processing unit 12 executes the image unit classifying process, and classifies each surrounding image into the plural predetermined road landscape classification items, based on the characteristics amount extracted by the road landscape characteristics amount extracting process (step S30). Thereby, the road landscape classification item is determined by the unit of the surrounding image.

Moreover, the map producing/processing unit 12 executes the section unit classifying process, and determines the road landscape classification item by a predetermined geographic section unit, based on the road landscape classification item determined by the unit of the surrounding image (step S40). Then, the map producing/processing unit 12 executes a landscape classifying/synthesizing process, and synthesizes the road landscape classification item with the map information such as the normal road map, based on the road landscape classification item by the unit of the section. Then, the map producing/processing unit 12 produces the road landscape map (step S50). In this manner, the road landscape map with which the road landscape information showing the road landscape is associated is obtained.

Next, a detailed description will be given of each process shown in FIG. 2.

Figure 3:
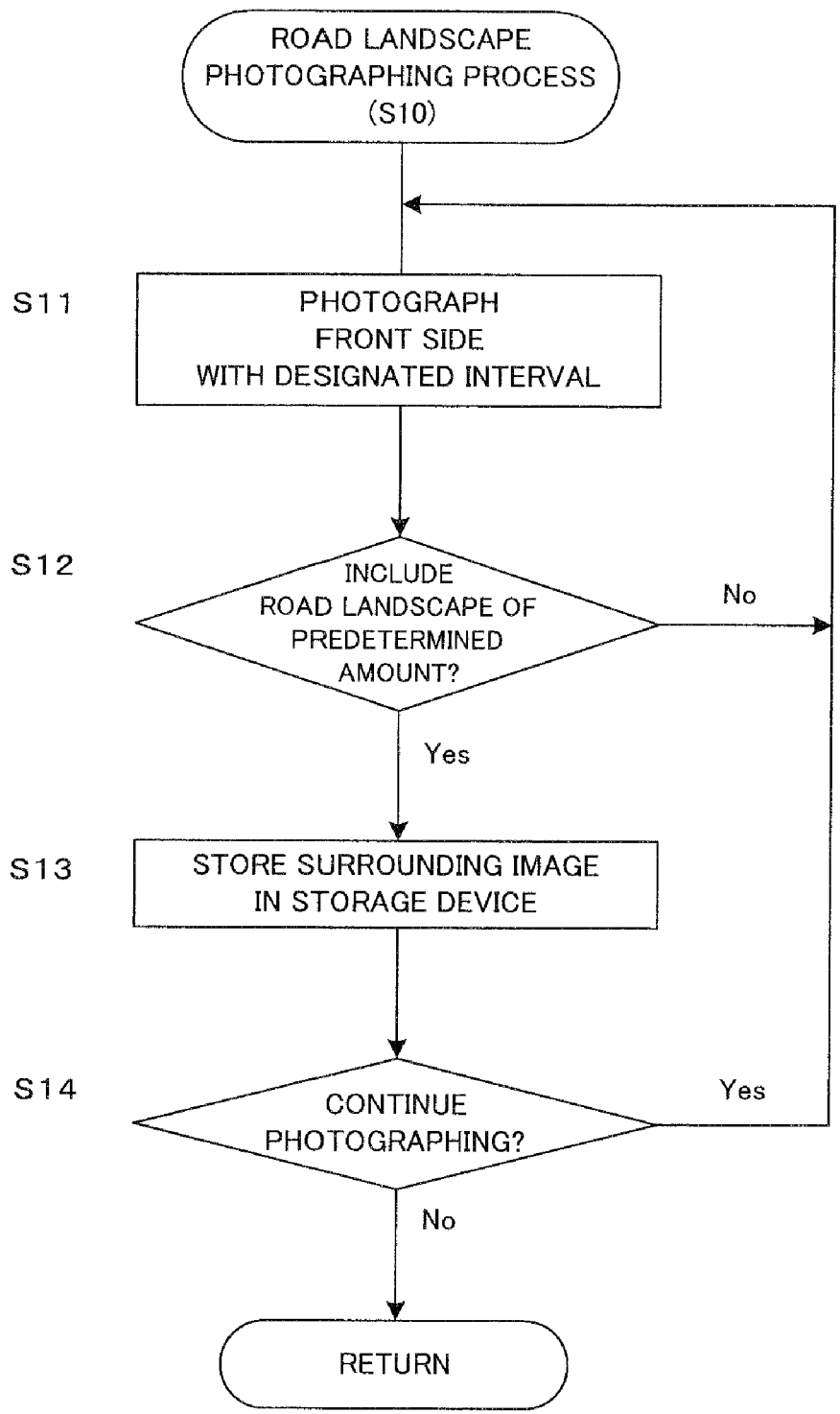
FIG. 3 is a flow chart of a road landscape photographing process.

First, the road landscape photographing process of step S10 will be explained. FIG. 3 shows a flow chart of the road landscape photographing process. In such a state that the movable body moves in an area subjected to the map production, the map producing apparatus 10 makes the camera 11 photograph the front side of the movable body with a designated interval, and obtains the surrounding images (step S11). "Designated interval" can be set by a time interval (e.g., for every several seconds) and a distance interval (e.g., for every several meters). Namely, the camera 11 obtains the still picture on the front side of the movable body as the surrounding image for every predetermined interval. By operating the information input device 15, an operator in the movable body may manually instruct the photographing timing.

Next, the map producing/processing unit 12 determines whether or not the obtained surrounding image includes the road landscape of the predetermined amount (step S12). Such a case that the obtained surrounding image does not include the road landscape of the predetermined amount means that the surrounding image does not sufficiently include the landscape at the point due to an obstacle. For example, in such a case that most parts of the photographed surrounding image is occupied by an obstacle, such as a heavy truck, a motor coach and a street-parking vehicle, existing on the front side of the movable body, it is determined that the surrounding image does not include the road landscape of the predetermined amount. The concrete determination whether or not the surrounding image includes the road landscape equal to or larger than the predetermined amount can be executed by the image processing of the surrounding image. For example, by the image processing, the map producing/processing unit 12 extracts the obstacle (e.g., the heavy truck and the motor coach in the above example) in the photographed surrounding image. When the ratio of the obstacle occupying the surrounding image is equal to or larger than the predetermined ratio, the map producing/processing unit 12 can determine that the surrounding image does not include the road landscape of the predetermined amount. When the map producing/processing unit 12 determines that the surrounding image does not include the road landscape of the predetermined amount (step S12; No), the surrounding image is not used, and the process returns to step S11.

When it is determined that the surrounding image includes the road landscape of the predetermined amount (step S12; Yes), the map producing/processing unit 12 stores the photographed surrounding image in the storage device 13 (step S13). At this time, the map producing/processing unit 12 associates the surrounding image with the position information (position coordinate) showing the photographing position, and stores them in the storage device 13. Concretely, the map producing/processing unit 12 obtains, from the GPS device 14, the position coordinate of the movable body at the time of instructing of the photographing of the surrounding image to the camera 11. Then, the map producing/processing unit 12 determines whether or not the photographing is continued. When the photographing is continued, the process goes back to step S11, and the process is repeated. Meanwhile, when the photographing is not continued, the process ends and returns to the main routine shown in FIG. 2. In this manner, the surrounding images including the road landscape of the predetermined amount are obtained.

Figure 4:
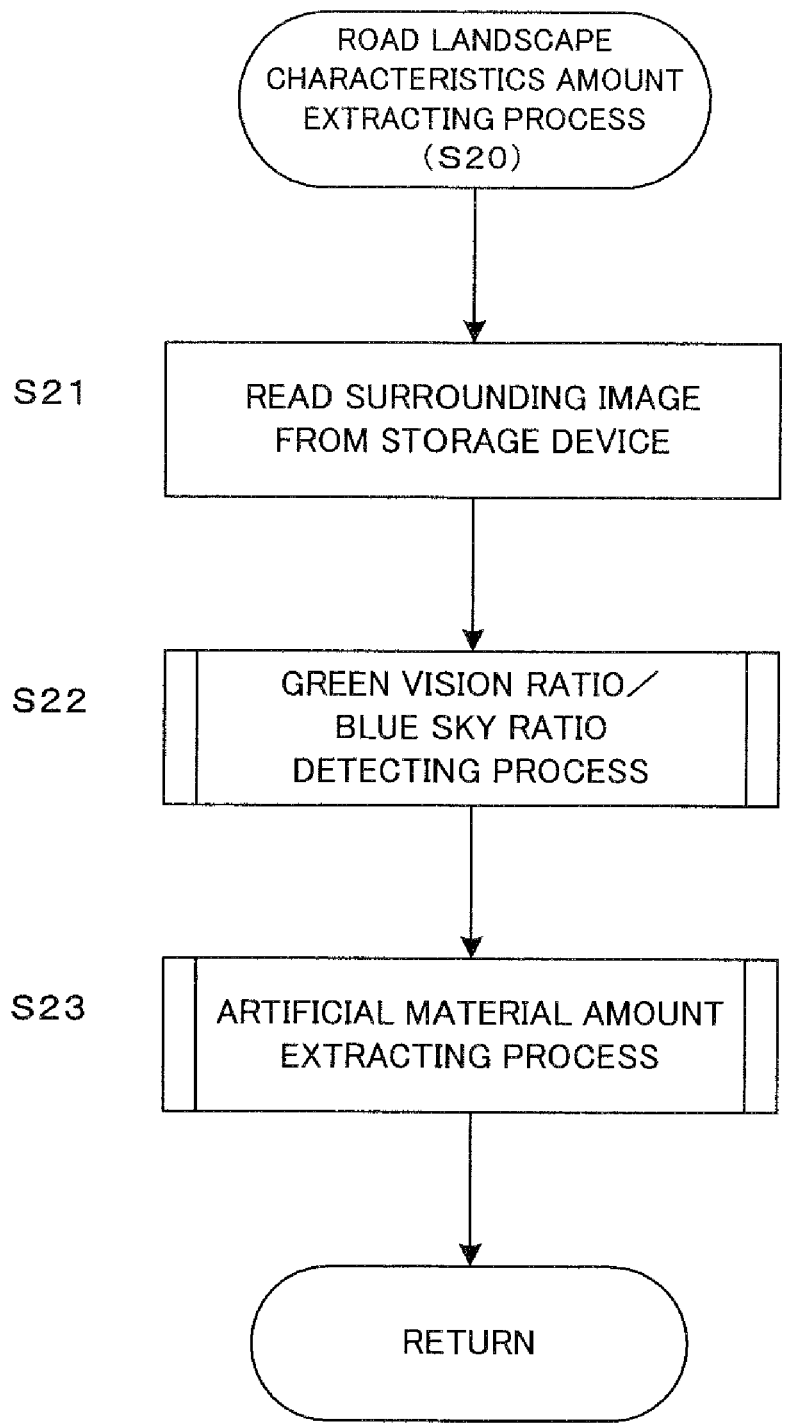
FIG. 4 is a flow chart of a road landscape characteristics amount extracting process.
Figure 5:
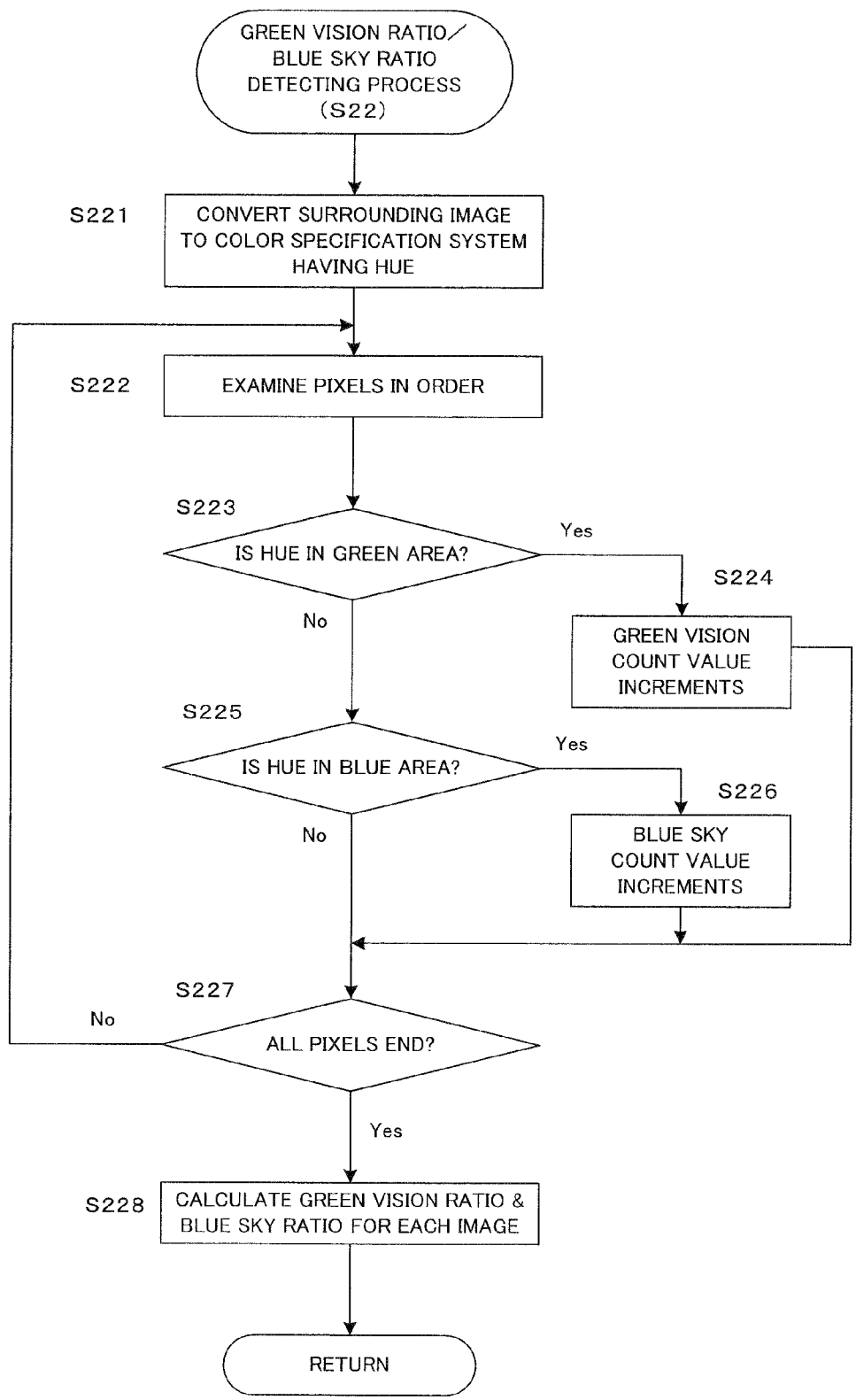
FIG. 5 is a flow chart of a green vision ratio/blue sky ratio detecting process.

Next, a description will be given of the road landscape characteristics amount extracting process. FIG. 4 shows a flow chart of the road landscape characteristics amount extracting process. First, the map producing/processing unit 12 reads the stored surrounding image from the storage device 13 (step S21), and executes the green vision ratio/blue sky ratio detecting process (step S22). FIG. 5 shows the detailed green vision ratio/blue sky ratio detecting process. "Green vision ratio" shows the level at which the landscape shown by the surrounding image includes the green area such as a forest and a mountain, i.e., the ratio of the green pixels included in the surrounding image. Additionally, "blue sky ratio" shows the level at which the landscape shown by the surrounding image includes a blue area such as the sky (mainly blue sky), i.e., the ratio of the blue pixels included in the surrounding image.

Figure 6:
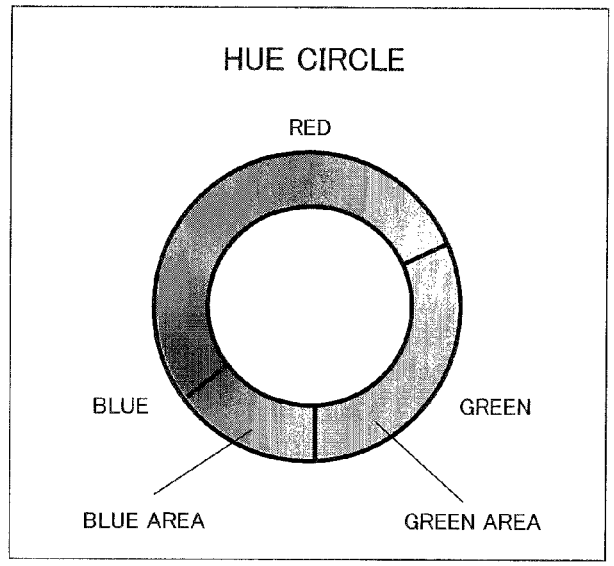
FIG. 6 shows a green area and a blue area in a hue circle.

As shown in FIG. 5, first, the map producing/processing unit 12 converts the read surrounding image into a color specification system having a hue serving as a parameter. The surrounding image photographed by the camera 11, being generally an RGB signal, is converted into an HLS (H: Hue, L: Luminance and S: Saturation) color specification system, for example. Next, the map producing/processing unit 12 chooses the single pixel forming the surrounding image (step S222), and determines whether or not the hue of the pixel is included in the green area (step S223). When the hue of the pixel is included in the green area (step S223; Yes), the map producing/processing unit 12 increments the count value (green vision count value) of the pixel number in the green area by 1 (step S224). In addition, when the hue of the pixel is not included in the green area (step S223; No), the map producing/processing unit 12 determines whether or not the hue of the pixel is included in the blue area (step S225). When the hue of the pixel is included in the blue area (step S225; Yes), the map producing/processing unit 12 increments the count value (blue sky count value) of the pixel number in the blue area by 1 (step S226). Both of the initial values of the green vision count value and the blue sky count value are 0. The blue area and the green area are defined in predetermined areas in the hue circle shown in FIG. 6.

The map producing/processing unit 12 determines whether or not the examination of all the pixels included in the surrounding image ends (step S227). The processes of steps S222 to S226 are repeated until the examination ends. When the examination of all the pixels ends (step S227; Yes), the map producing/processing unit 12 calculates the green vision ratio and the blue sky ratio of the surrounding image (step S228), and the process returns to the main routine. The green vision ratio is calculated by dividing the green vision count value by the number of all the pixels of the surrounding image, and the blue sky ratio is calculated by dividing the blue sky count value by the number of all the pixels of the surrounding image.

Figure 7:
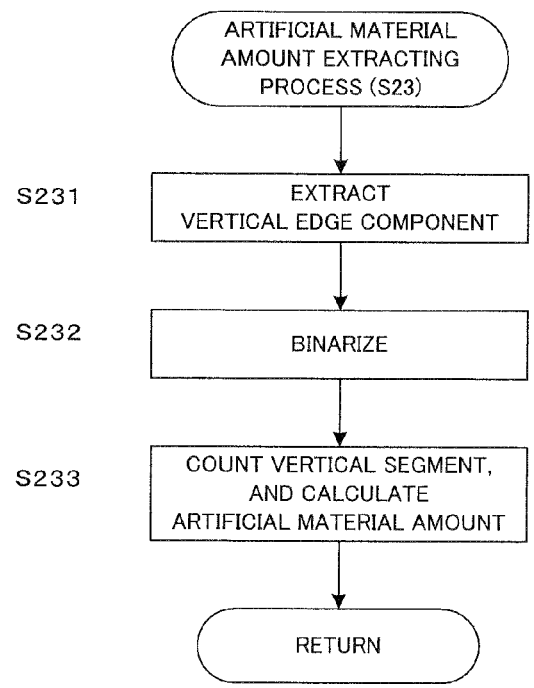
FIG. 7 is a flow chart of an artificial material amount extracting process.

Next, the process returns to FIG. 4, and the map producing/processing unit 12 executes the artificial material amount extracting process (step S23). The detailed artificial material amount extracting process is shown in a flow chart shown in FIG. 7. The artificial material amount extracting process is a process of obtaining the amount of artificial material such as a building, a telegraph pole, a vehicle and others included in the photographed surrounding image. It is focused that most of the shapes of the artificial materials such as the building and the telegraph pole are formed by vertical segments. Thereby, the vertical segment is extracted from the surrounding image in the artificial material amount extracting process.

Concretely, the map producing/processing unit 12 extracts vertical edge components in the surrounding image with using a Sobel filter (step S231), and binarizes the vertical edge components (step S232). Then the map producing/processing unit 12 counts the vertical edge components continuously positioned in the vertical direction, and detects the vertical section equal to or larger than a constant length. The number of detected vertical sections is prescribed as the artificial material amount (step S233). Then, the process returns to the main routine shown in FIG. 2.

Next, a description will be given of an image unit classifying process. The image unit classifying process is a process of determining of the road landscape classification item corresponding to the surrounding image by the surrounding image unit. The road landscape classification item is an example of the road landscape information showing the road landscape, and includes "streetscape", "forest" and "open road" in this embodiment. The surrounding image which cannot be classified into these three road landscape classification items is classified into a classification item "other". Specifically, the map producing/processing unit 12 classifies the surrounding image into the above four road landscape classification items with using the characteristics amount for each surrounding image (i.e., the green vision ratio, the blue sky ratio and the artificial material extraction amount) obtained in the road landscape characteristics amount extracting process. A concrete example of a classification reference will be shown below.

(1) The surrounding image including the small green vision ratio, the small blue sky ratio and the large artificial material amount is classified into "streetscape".

(2) The surrounding image including the large green vision ratio, the small blue sky ratio and the small artificial material amount is classified into "forest".

(3) The surrounding image including the small green vision ratio, the large blue sky ratio and the small artificial material amount is classified into "open road".

(4) The surrounding image which does not correspond to the above three items is classified into "other".

The classifying process is characterized in that the classification into the road landscape classification items is executed with using the entire three characteristics amount (i.e., "green vision ratio", "blue sky ratio" and "artificial material amount"). When the classification into the road landscape classification items is executed with using only "artificial material amount" being one of the characteristics, the open road having many telegraph poles can be erroneously classified into "streetscape". In this point, by executing the classification with using the three characteristics amount, the above erroneous classification can be prevented. In the above example of the classification reference, whether the green vision ratio, the blue sky ratio and the artificial material amount are large or small can be determined by comparing them with threshold values individually prepared, respectively.

In this manner, by the image unit classifying process, the road landscape classification item is determined to each of the photographed surrounding image. The map producing/processing unit 12 temporarily stores the road landscape classification by the unit of the surrounding image determined in this manner in the storage device 13.

The above road landscape characteristics amount extracting process (step S20) and the above image unit classifying process (step S30) may be executed every time the single surrounding image is photographed, and may be executed at one time after the predetermined number or all of the surrounding images are obtained.

Next, a description will be given of a section unit classifying process. FIG. 8 is a flow chart showing the section unit classifying process in details. First, the map producing/processing unit 12 obtains, from the storage device 13, the road landscape classification item of the surrounding image included in a certain geographic section (step S41). "Section" is the unit obtained by dividing a geographic area, e.g., a constant distance, an interval between intersections and a section obtained by dividing the interval between the intersections into constant distances, based on a predetermined reference. The map producing/processing unit 12 accumulates the road landscape classification items of the plural surrounding images included in the section, and determines the largest road landscape classification item as the road landscape classification item of the section (step S42). Thereby, the landscape classification is executed for each of the geographically predetermined sections. When the accumulation values of two or more road landscape classification items are same, the road landscape classification item may be determined based on the predetermined priority, e.g., "streetscape", "forest" and "open road", or may be chosen at random from the plural road landscape classification items having the same accumulation values. In addition, the road landscape classification item may be determined by interpolation and estimation, based on the road landscape classification items of the anteroposterior sections on the road.

FIG. 9 shows an example of the landscape classification for each section, determined in this manner. In FIG. 9, "position coordinate" shows the geographic coordinate showing each section, and the road landscape classification item is assigned for each section.

Next, a description will be given of the landscape classifying/synthesizing process. The landscape classifying/synthesizing process is a process of producing the road landscape map capable of visually displaying the road landscape information on the map, based on the road landscape classification item for each section, which is determined by the above section unit classifying process. Specifically, based on the road landscape classification item by the section unit shown in FIG. 9, the map producing/processing unit 12 adds the display data visually showing the road landscape information corresponding to the road landscape classification item for each section to the normal road map data stored in the storage device 13, and produces the road landscape map.

Figure 10A:
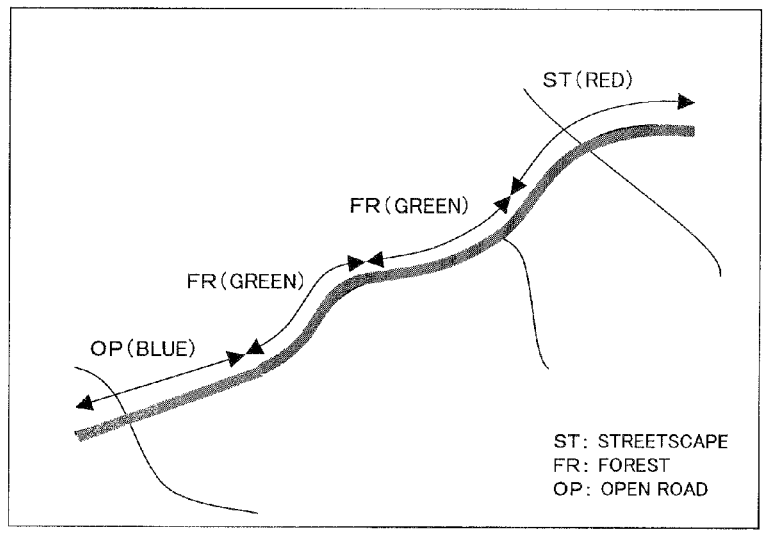
FIGS. 10A and 10B show display examples of a road landscape map.

An example of the road landscape map will be explained below. FIG. 10A shows an example of the road landscape map showing the road landscape classification item for each section by display colors. Each arrow shown in FIG. 10A shows one section, and marks (ST: Streetscape, FR: Forest and OP: Opend road) showing the road landscape classification items are given to each section. Additionally, in the example shown in FIG. 10A, the display color showing the road landscape classification item is shown next to a mark showing each of the road landscape classification items with using parentheses. For example, the section shown by "FR(green)" is classified into "forest", which is shown by the green display color. In this embodiment, the road, lines of both sides of the road, parts of lands on both sides of the road and an area in the vicinity of the road are displayed by the display color showing the road landscape classification item. When the road landscape map according to this embodiment is produced based on the normal road map, it is preferable to use a color other than the color used in the normal road map such as "red" and "blue", as the display color showing the road landscape classification item. Also, it is preferable to shift the segment of the display color to the side of the actual road and display it. Thereby, it does not happen that the segment showing the road landscape classification item is confused with the actual road used for the normal road map. Instead of displaying the segment showing the road landscape classification item on the normal road map, the road landscaped map displaying the road landscape classification item on the simplified map, such as a sightseeing map, may be produced.

Figure 10B:
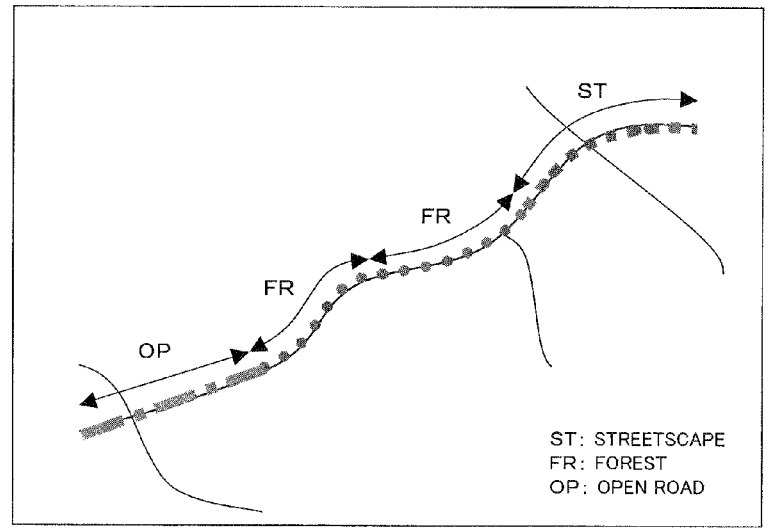

FIG. 10B shows an example of the road landscape map showing the road landscape classification item for each section with using segments of different kinds. In this example, the streetscape ST, the forest FR and the open road are shown by a square dotted line, a circular dotted line and a chain dotted line, respectively. Displaying the road landscape classification items of the segments of these kinds may be combined with the displaying by the display color shown in FIG. 10A.

Figure 11A:
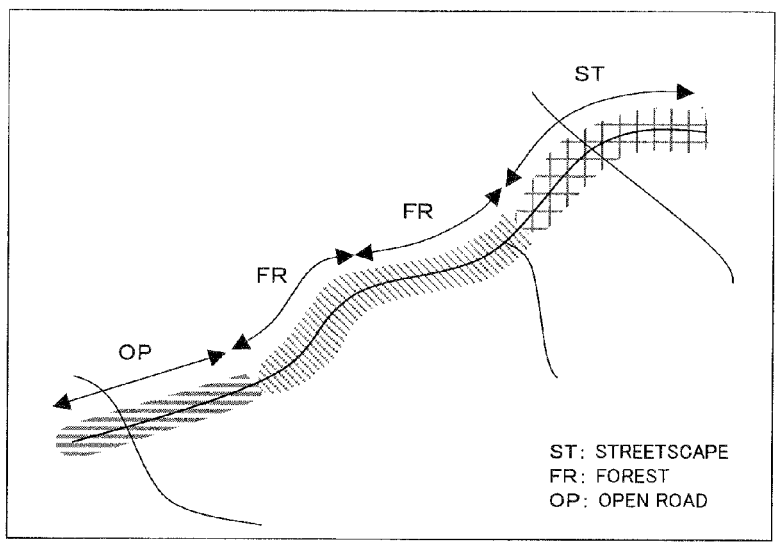
FIGS. 11A and 11B show other display examples of the road landscape map.

FIG. 11A shows an example of the road landscape map, in which the road landscape classification item for each section is shown by a pattern. In this example, the streetscape ST, the forest FR and the open road OP are shown by a checked pattern, a diagonal pattern and a horizontal-line pattern, respectively. In addition, the road landscape classification items may be distinguished with using various kinds of textures other than the pattern. Moreover, the pattern may be combined with the display of the road landscape classification item by the above display color.

Figure 11B:
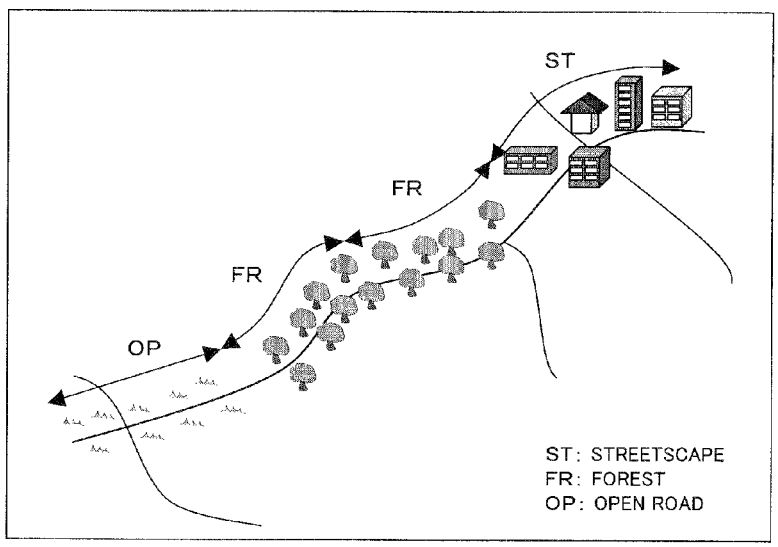

FIG. 11B shows an example of the road landscape map showing the road landscape classification item for each section with using an icon. In this example, icons of towers and buildings are displayed in the section of the streetscape ST, and icons of trees are displayed in the section of the forest FR. Further, icons of grasses and paddy fields are displayed in the section of the open road OP. When the icons of the buildings are used in the original map, the icons of "forest" and "open road" may be additionally used. In such a case that a three-dimensional map is used, three-dimensional icons may be used for displaying the road landscape classification items. Moreover, in accordance with the season, the colors of the icons may be changed. The icons may be combined with the display of the road landscape classification items by the above-mentioned display colors.

The section, which is classified not into the above three road landscape classification items but into "other", may be displayed based on the display color, the segment of the kind and the pattern corresponding to "other". Also, it is possible that the section classified into "other" is not particularly displayed.

(Management of Road Landscape Map)

The map producing/processing unit 12 manages the road landscape map with using the storage device 13. For example, in a case of producing a new road landscape map in the same section as the road landscape map corresponding to the specific section stored in the storage device 13, the old road landscape map is deleted, and the road landscape map is updated. When there are the plural road landscape maps of the same section under conditions of the different producing season, time and climate, the map producing/processing unit 12 may store only the road landscape map in good condition, and may store the plural road landscape maps in each condition. When the sum amount of information of the produced road landscape map becomes larger than the amount of information storable in the storage device 13, the old road landscape map may be deleted in order.

Second Embodiment

Next, a description will be given of a second embodiment of the present invention. In the second embodiment, the road landscape map producing technique of the present invention is applied to a system including the network and the server.

Example of First System

Figure 12:
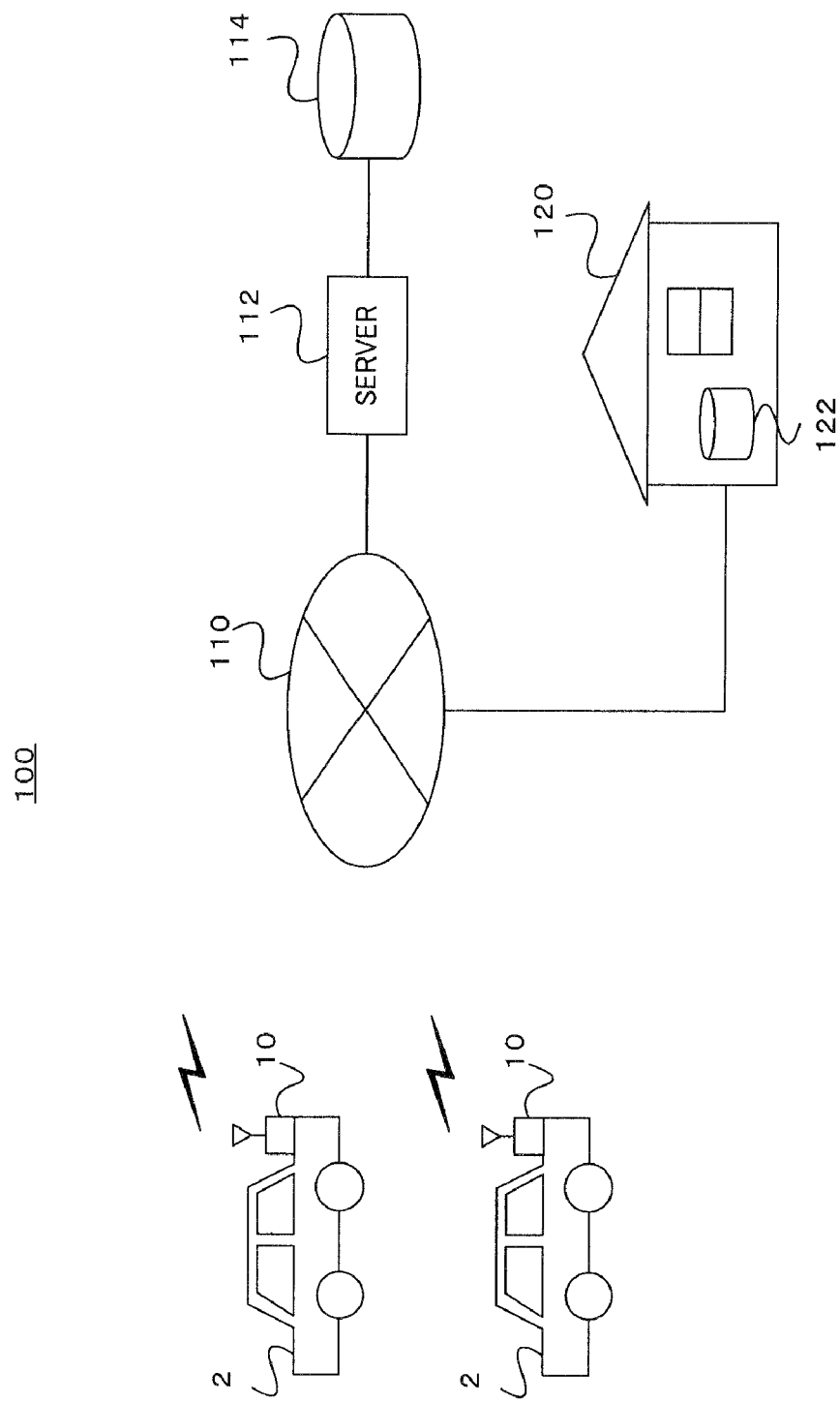
FIG. 12 is a block diagram schematically showing a road landscape map producing system according to a second embodiment.

FIG. 12 shows a schematic configuration of the road landscape map producing system according to the second embodiment. As shown, in a road landscape map producing system 100, the map producing device 10 is loaded on one or plural movable body (bodies). The map producing device 10 loaded on the movable body 2 can communicate with a server 112 via a network 110 by wireless communication. The map producing device 10 transmits the surrounding image photographed by the camera 11 to the server 112 via the network 110. Additionally, the map producing device 10 can take out the surrounding image, which is photographed with using the movable body 2, to a home 120 in a form such as a storage medium, and can transmit the surrounding image to the server 112 from a storage device 122 in the home 120 via the terminal device and the network 110.

The server 112 is connected to a database 114. Based on the surrounding images obtained via the network 110, the server 112 executes the same road landscape map producing process as that of the map producing/processing unit 12 according to the first embodiment, and produces the map landscape map to store it in the database 114.

In this manner, based on the surrounding image collected with using the plural movable bodies 2, the server 112 produces the road landscape map, and stores the road landscape map in the database 114. Thereby, the road landscape map in the wide range can be efficiently produced.

Example of Second System

In the example of the first system, the map producing device 10 of each movable body 2 transmits, to the server 112, the surrounding image photographed by the camera 11, and the server 112 produces the road landscape map. Instead, in an example of the second system, the map producing device 10 of each movable body 2 produces the road landscape map, similarly to the first embodiment, and transmits the road landscape map to the server 112 via the network 110.

In this case, the server 112 mainly collects and manages the road landscape map supplied from the plural map producing devices 10 with using the database 114. For example, in the case of receiving, from the map producing device 10 of the other movable body 2, the new road landscape map of the same section as that of the road landscape map corresponding to the specific section stored in the database 114, the old road landscape map is deleted, and the road landscape map is updated. In the case of receiving the plural road landscape maps of the same section under the conditions of the different producing season, time and climate, the server 112 may store only the road landscape map in good condition, or may store the plural road landscape maps in each condition. In addition, by setting the information amount storable in the database 114 for each section on the map, the old map may be deleted in order, in the case of receiving the map landscape map larger than the set information amount.

In both of the examples of the first and second systems, the road landscape map stored in the database 114 can be transmitted to the movable body 2 via the network 110, and can be used for the navigation on the movable body 2. Similarly, the road landscape map may be downloaded to the storage device 122 in the home 120 via the network 110, and may be used in the home. Moreover, the road landscape map may be printed out by a printer to be used.

Modification

The road landscape classification items according to the above embodiment may be divided by levels. For example, even in the case of applying to the same road landscape classification item "streetscape", the amount of artificial materials is different between a group of high-rise buildings and a residential street. Even in the case of applying to the same road landscape classification item "forest", the green vision ratio is different between an avenue and deep woods. Even in the case of applying to the same road landscape classification item "open road", feeling of opening is different dependently on the degree of the blue sky ratio. Thus, the same road landscape classification items are divided into the plural levels, and not only the road landscape classification item but also the level are determined, based on the characteristics amount such as the green vision ratio and the artificial material amount. In accordance with the determined level, the color information and the icon displayed on the road landscape map are made different. Thereby, as for even the same road landscape classification item, more detailed landscape difference and tendency can be expressed.

In addition, for each section, the typical surrounding image showing the characteristics of the road landscape of the section can be chosen and associated with the road landscape map to be stored in the storage device 13 and the database 114. Thereby, the user can refer to the road landscape map and browse the typical image showing the landscape in each section, in the movable body 2 and the home 120.

[Application of Road Landscape Map]

By the road landscape map produced by the road landscape map producing method of the present invention, the road landscape information at the point for each section can be visually displayed. Therefore, in a route search and a route guidance with using the road landscape map, various kinds of applications which will be described below become possible.

In such a case that the data of the road landscape map is used as the map data in the navigation device, applications which will be described below become possible.

(1) At the time of setting a traveling passage, a priority and a bypass can be designated in "streetscape", "forest" and "open road", respectively.

(2) According to the situation, the traveling passage can be changed, e.g., "forest" is prior in fine weather.

(3) When the movable body enters the sightseeing area, the priority of the traveling passage can be switched to "forest".

(4) During traveling the movable body, the user can choose the road landscape classification item in accordance with his or her feeling. For example, when the user feels stressed, "open road" can be preceded in the traveling passage.

(5) When there are many forests around the home, "streetscape" can be preceded in the traveling passage far from the home. Meanwhile, when the home is in the streetscape, "forest" can be preceded in the traveling passage far from the home.

(6) Attention to the traveling speed may be roused in "open road".

(7) In order not to make the user bored of driving, the combination of "streetscape", "forest" and "open road" in the passage may be considered. For example, the combination may be considered so that the user can travel in "streetscape", "forest" and "open road" in order.

(8) At the time of setting the passage to the destination, "streetscape", "open road" and "forest" may be set in order.

(9) By calculating the total of the traveling distances of "streetscape", "forest" and "open road" with using the traveling history and by analyzing the traveling distance of "forest" in the sightseeing area, the favorite road landscape of the user can be learned, and thereby the subsequently traveling passage setting can be determined.

(10) Busy "streetscape" may be preceded in the midnight, and quiet "forest" and "open road" may be preceded in the day time.

(11) In order not to make the driver feel sleepy, the attention may be roused by sound in the particularly long "open road".

(12) During meals, "streetscape" can be preceded.

(13) When the necessity of fueling becomes high, "forest" may be avoided.

(14) When there is only one passenger in the midnight, "forest" may be avoided.

(15) In correspondence with the number of passengers, the priority and bypass of "streetscape", "forest" and "open road" may be designated. For example, when there are plural passengers, "open road" may be preceded.

(16) By setting the traveling speed of "streetscape", "forest" and "open road" in advance, the arrival time of the destination may be estimated. The average speed may be calculated based on the traveling history to be used.

(17) When the plural passage candidates are displayed as the search result at the time of the passage search, the road landscape information (i.e., not only the time and the distance, but also the ratio and outlines of "streetscape", "forest" and "open road") may be displayed.

(18) When the traffic-jam avoidance is designated in "streetscape", the traveling passage may be changed to "forest" and "open road".

(19) The combination of the road shapes of the road landscape information and the map information may be used for the passage search. For example, the straight road in the map information may be preceded in "open road".

(20) "Other" road having no characteristics may be avoided.

(21) By setting "streetscape", "forest" and "open road" as keywords and icons, the passage and the circumference may be searched.

INDUSTRIAL APPLICABILITY

The present invention is applicable to production of map data used in an on-vehicle navigation apparatus and production of map data browsed on the Internet website. In addition, by printing the map data produced in the present invention, a map brochure and a book can be produced.

The invention claimed is:

1. A road landscape map producing apparatus which is loaded on a movable body, comprising:
    a photographing device configured to output a still picture, an entirety of the still picture defining a surrounding image in accordance with a movement of the movable body;
    an image processing unit configured to execute image processing of the surrounding image and to classify an entirety of the surrounding image as a single predetermined road landscape classification item; and
    a producing unit configured to i) associate, based on a geographic position at which the surrounding image is photographed, the road landscape classification item with map information, and ii) produce a road landscape map,
    wherein the image processing unit includes i) a characteristics amount extraction unit configured to extract a plurality of predetermined characteristics amounts from the surrounding image, and ii) an image unit classification unit configured to determine the single road landscape classification item for the surrounding image based on the plurality of extracted characteristics amounts.

2. The road landscape map producing apparatus according to claim 1,
    wherein the image unit classification unit determines the single road landscape classification item from a plurality of predetermined road landscape classification items.

3. The road landscape map producing apparatus according to claim 2,
    wherein the characteristics amounts include a green vision ratio corresponding to a ratio of green area identified in the surrounding image, a blue sky ratio corresponding to a ratio of sky area identified in the surrounding image, and an artificial material amount corresponding to an amount of artificial materials identified in the surrounding image.

4. The road landscape map producing apparatus according to claim 3,
wherein the plurality of predetermined road landscape classification items includes a streetscape, a forest, and an open road, and
wherein the image unit classification unit determines the single road landscape classification item based on the green vision ratio, the blue sky ratio and the artificial material amount.

5. The road landscape map producing apparatus according to claim 1,
wherein the producing unit includes i) a section unit classification unit configured to determine a road landscape classification item of a predetermined section unit, based on the road landscape classification item of the surrounding image included in a predetermined section of the map information, and ii) an association unit configured to associate the road landscape classification item of the section unit with the map information for the predetermined section.

6. The road landscape map producing apparatus according to claim 1, wherein the road landscape map includes the map information and a display data visually showing road landscape information corresponding to the road landscape classification item.

7. The road landscape map producing apparatus according to claim 1, further comprising:
a display device; and
a display control unit which displays the road landscape map on the display device in a form visually distinguishing the road landscape classification item.

8. A road landscape map producing method, comprising:
photographing, from a movable body and in accordance with a movement of the movable body, a still picture, an entirety of the still picture defining a surrounding image;
performing, with a computing device, image processing upon the surrounding image acquired in the photographing step and classifying an entirety of the surrounding image as a single predetermined road landscape classification item;
associating, by means of the computing device and based on a geographic position at which the surrounding image is photographed, the road landscape classification item with map information; and
producing and storing a road landscape map in a memory of the computing device,
wherein the image processing process includes the sub steps of:
extracting a plurality of predetermined characteristics amounts from the surrounding image; and
determining the single road landscape classification item for the surrounding image based on the plurality of extracted characteristics amounts.

9. A computer program product in a computer-readable medium executed by a computer loaded on a movable body, the computer program product configured to make the computer function as:
a photographing unit configured to control a photographing device to acquire a still picture, an entirety of the still picture defining a surrounding image in accordance with a movement of the movable body;
an image processing unit configured to execute an image processing of the surrounding image and classify an entirety of the surrounding image as a single predetermined road landscape classification item; and
a producing unit configured to associate, based on a geographic position at which the surrounding image is photographed, the road landscape classification item with map information, and to produce a road landscape map in a memory of the computer,
wherein the image processing unit includes i) a characteristics amount extraction unit configured to extract a plurality of predetermined characteristics amounts from the surrounding image, and ii) an image unit classification unit configured to determine the single road landscape classification item for the surrounding image based on the plurality of extracted characteristics amounts.

10. A movable body navigation apparatus, comprising:
a photographing device configured to acquire a still picture, an entirety of the still picture defining a surrounding image in accordance with a movement of a movable body;
an image processing unit configured to execute image processing of the surrounding image and to classify an entirety of the surrounding image as a single predetermined road landscape classification item;
a producing unit configured to i) associate, based on a geographic position at which the surrounding image is photographed, the road landscape classification item with map information, and ii) produce a road landscape map;
a measurement unit which obtains a present position of the movable body;
a display device; and
a display control unit which displays the road landscape map around the present position on the display device in a form capable of visually distinguishing the road landscape classification item,
wherein the image processing unit includes i) a characteristics amount extraction unit configured to extract a plurality of predetermined characteristics amounts from the surrounding image, and ii) an image unit classification unit configured to determine the single road landscape classification item for the surrounding image based on the extracted characteristics amounts.

11. A road landscape map producing system, comprising:
a receiving unit configured to receive a still picture, an entirety of the still picture defining a surrounding image photographed in accordance with a movement of a movable body;
an image processing unit configured to execute image processing of the surrounding image and to classify an entirety of the surrounding image as a single predetermined road landscape classification item;
a producing unit configured to i) associate the road landscape classification item with map information, based on a geographic position at which the surrounding image is photographed, and ii) produce a road landscape map; and
a database which stores the road landscape map,
wherein the image processing unit includes i) a characteristics amount extraction unit configured to extract a plurality of predetermined characteristics amounts from the surrounding image, and ii) an image unit classification unit configured to determine the single road landscape classification item for the surrounding image based on the extracted characteristics amounts.

* * * * *